Patented Mar. 3, 1936

2,032,749

UNITED STATES PATENT OFFICE 2,032,749

ESTERIFICATION OF CELLULOSE

Joseph F. Haskins, Wilmington, Del., assignor to E. I. du Pont de Nemours & Company, Wilmington, Del., a corporation of Delaware No Drawing. Application June 24, 1932, Serial No. 619,120

26 Claims. (Cl. 260—101)

This invention relates to the preparation of cellulose esters.

It is known that cellulose can be esterified by the action of acid halides in the presence of tertiary amines in sufficient excess to produce a basic reaction mass. The cellulose ester resulting from this process has an undesirable color which is apparently caused by the reaction of some of the acid halide and some of the tertiary amine to form a ketene and by the polymerization of the ketene to form colored resins which are hard to remove. It is also known that cellulose may be esterified by the action of acid anhydrides in the presence of tertiary amines and, in particular, in the presence of pyridine. This reaction is, however, unsatisfactory in that the esterification is extremely slow and in that the products are in general of poor solubility.

In the copending application of Haskins and Schulze, Serial Number 422,549, filed January 22, 1930, Patent No. 1,967,405, July 24, 1934, it has been disclosed that acid anhydrides will esterify cellulose readily in the presence of tertiary amines provided appropriate catalysts are used. This reaction, because of the non-formation or less formation of objectionable by-products, produces a more easily purified product. This process is to be preferred to the process wherein acid chlorides are used except that in some cases the acid chloride is more conveniently or more economically prepared than the acid anhydride.

In my copending case Serial Number 553,006, filed July 24, 1931, there is described the production of an esterifying solution by the interaction of organic acid chlorides with organic carboxylic acids in the presence of tertiary amines. The present case is an improvement upon the invention disclosed in the last-identified copending case.

It is an object of the invention to esterify cellulose in particular and carbohydrates in general. The reaction is applicable to various forms of pure celluloses including the alpha, beta, and gamma forms, to modified celluloses which still retain a reactive hydroxyl group such as hydrocelluloses and the partially esterified or etherified cellulose esters and ethers. Among the carbohydrates to which the process may be applied are the polyoses in general and starch in particular.

The invention will be described in its application to the esterification of cellulose.

The objects of the invention are accomplished, generally speaking, by reacting cellulose with a bath made by mixing a fatty acid, a tertiary amine such as pyridine, and its homologs, and phosgene in an inert diluent. The following description and examples are exemplary and are not to be construed as limitative.

Example I

Ten (10) parts of pyridine and 9.4 parts of propionic acid were added to 60 parts of dioxane. This solution was warmed slightly and phosgene was passed into it until it became acid to methyl orange. Carbon dioxide was formed and was allowed to escape through benzene to dissolve any phosgene which it contained. The mixture was then heated to expel more carbon dioxide. When the carbon dioxide ebullition had substantially ceased, enough pyridine was added to make the solution basic to methyl orange and about 5 parts excess in addition. This solution was then mixed with about 1 part of alpha cellulose (cotton linters pulp). The whole was placed in a tube which was sealed and heated at 110° C. with agitation until solution was complete. This required about ten hours.

After the reaction was completed there were two layers present in the tube, the lower layer consisting essentially of pyridine hydrochloride and the upper layer consisting of a solution of cellulose propionate in dioxane. Upon cooling, the lower layer solidified and the upper layer was poured into water with stirring, precipitating the cellulose ester. The precipitate was washed with water and dried and proved to be a cellulose tripropionate soluble in chloroform, acetone, pyridine and dioxane.

Example II

To about 60 parts of chlorobenzene were added about 10 parts of pyridine, about 3.8 parts of acetic acid and about 6.5 parts of iso-valeric acid. The passing of phosgene into the mixture and the remainder of the experiment were carried out substantially as in Example I except that the reaction product was coagulated in a mixture of water and methyl alcohol. The ester proved to be a mixed cellulose acetate iso-valerate soluble in chlorofrom, acetone, pyridine, and dioxane.

The diluents listed in the above examples are dioxane and chlorobenzene but many other diluents are useful. Among the useful diluents benzene, amyl acetate, and nitrobenzene may be named as of particular value. These compounds do not by any means exhaust the list, which contains a great many compounds, but serve to illustrate the fact that the character of the diluent is not limited to any particular class of compounds. The diluent may be omitted from the reaction mixture but its omission is not desirable because of the formation of colored by-products.

Other acids, for example, capric, lauric, and stearic, may be used but with them the reaction goes more slowly. Acids having from two to eight carbon atoms are in general those giving the preferred results in our process.

The range of temperatures at which the reaction can be carried out is extremely broad and it is neither necessary nor desirable to state upper and lower limits thereof. As the temperature at which the reaction takes place affects the solubility of the product, it is advantageous to use temperatures between about 80° and about 150° C. when a product having good solubility is desired. The temperature not being critical as to actual operativeness of the process, determination of the maximum and the minimum temperatures which give optimum results is best left to the chemist to select in view of the characteristics he desires in the product.

The examples were carried out at elevated pressures but this is not essential. The reaction can be carried out at ordinary or at reduced pressures although the volatility of certain ingredients of the reaction makes the latter less easy to manipulate.

An advantage of this invention over prior processes lies in the low cost of the reactants. Another advantage is in that the by-products of the reaction between the esterifying materials are gaseous and pass off leaving a solution uncontaminated by by-products. Other advantages of the invention are in part apparent and in part set forth elsewhere in the specification.

As many apparently widely different embodiments of this invention may be made without departing from the spirit and scope thereof, it is to be understood that I do not limit myself to the specific embodiments thereof except as defined in the appended claims.

I claim:

1. The method of esterifying cellulose which comprises mixing about 10 parts of pyridine and about 9.4 parts of propionic acid with about 60 parts of dioxane, passing phosgene into the solution at slightly elevated temperature until the solution becomes acid to methyl orange, heating to expel carbon dioxide, adding pyridine in slight excess to make the solution basic to methyl orange, and treating about 1 part of cellulose with the solution at a temperature of about 110° C. and at elevated pressure until solution is substantially complete.

2. The method of esterifying cellulose which comprises mixing pyridine and propionic acid with dioxane, passing phosgene into the solution at slightly elevated temperature until it becomes acid to methyl orange, heating to expel carbon dioxide, adding pyridine in slight excess to make the solution basic to methyl orange, and treating cellulose with the solution at a temperature of about 110° C. and at elevated pressure until solution is substantially complete.

3. The method of esterifying cellulose which comprises mixing pyridine and propionic acid with dioxane, passing phosgene into the solution at slightly elevated temperature until it becomes acid to methyl orange, heating to expel carbon dioxide, adding pyridine to make the solution basic to methyl orange and adding cellulose to the solution and heating to a temperature of about 110° C. in a closed vessel.

4. The method of esterifying cellulose which comprises mixing pyridine and propionic acid with an inert diluent, passing phosgene into the solution at slightly elevated temperature until it becomes acid to methyl orange, expelling carbon dioxide, adding pyridine to make the solution basic to methyl orange, adding cellulose to the solution and heating to a temperature of about 110° C. in a closed vessel.

5. The method of esterifying cellulose which comprises mixing pyridine and a fatty acid with an inert diluent, passing phosgene into the solution until it becomes acid to methyl orange, adding pyridine to make the solution basic to methyl orange, adding cellulose to the solution and heating in a closed vessel until solution is substantially complete.

6. The method of esterifying cellulose which comprises mixing pyridine, phosgene, and a fatty acid with an inert diluent in proportions of phosgene to the other ingredients such that the solution will be acid to methyl orange, adding pyridine to make the solution basic to methyl orange, and heating cellulose in the solution in a closed vessel until solution is substantially complete.

7. The method of esterifying cellulose which comprises reacting pyridine, phosgene, and an aliphatic monocarboxylic acid in an inert diluent and treating cellulose with the solution at elevated temperature.

8. The method of esterifying cellulose which comprises mixing about 10 parts of pyridine, about 3.8 parts of acetic acid, and about 6.5 parts of iso-valeric acid with about 60 parts of chloro-benzene, passing phosgene into the solution at slightly elevated temperature until the solution becomes acid to methyl orange, heating to expel carbon dioxide, adding pyridine until the solution is basic to methyl orange and treating about 1 part of cellulose with the solution at a temperature of about 110° C. and at elevated pressure.

9. The method of esterifying cellulose which comprises mixing pyridine, acetic acid, and iso-valeric acid with chloro-benzene, passing phosgene into the solution at slightly elevated temperature until the solution becomes acid to methyl orange, heating to expel carbon dioxide, adding pyridine until the solution is basic to methyl orange, and treating cellulose with the solution at a temperature of about 110° C. at elevated pressure.

10. The method of esterifying cellulose which comprises mixing pyridine, acetic acid, and iso-valeric acid with an inert diluent, passing phosgene into the solution until the solution becomes acid to methyl orange, expelling carbon dioxide, adding pyridine until the solution is basic to methyl orange, and treating cellulose with the solution at elevated temperature and elevated pressure.

11. The method of esterifying cellulose which comprises mixing phosgene, pyridine, acetic acid, and iso-valeric acid with an inert diluent in proportions acid to methyl orange, expelling carbon dioxide, adding pyridine until the solution is basic to methyl orange, and treating cellulose with the solution at elevated temperature and elevated pressure.

12. The method of esterifying cellulose which comprises mixing phosgene, pyridine, acetic acid, and iso-valeric acid in proportions acid to methyl orange, adding pyridine until the solution is basic to methyl orange, and esterifying cellulose with the solution.

13. The method of esterifying cellulose which comprises mixing phosgene, pyridine, a fatty acid, and a different fatty acid in proportions acid to methyl orange, adding pyridine until the solution is basic to methyl orange, and esterifying cellulose with the solution.

14. The method of esterifying cellulose which comprises mixing phosgene, pyridine, an aliphatic monocarboxylic acid and a different aliphatic monocarboxylic acid, adding pyridine until the solution is basic to methyl orange, and esterifying cellulose with the solution.

15. The method of esterifying cellulose which comprises mixing phosgene and pyridine with a plurality of fatty acids, and esterifying cellulose with the solution.

16. The method of esterifying cellulose which comprises reacting cellulose with the contents of a bath made by mixing an aliphatic monocarboxylic acid, phosgene, and pyridine.

17. In a process of esterifying cellulose the step which comprises adding phosgene to a fatty acid and pyridine.

18. The method of esterifying cellulose which comprises reacting pyridine, phosgene, and an aliphatic monocarboxylic acid having from two to eight carbon atoms in an inert diluent, and treating cellulose with the solution at elevated temperature.

19. The method of esterifying cellulose which comprises mixing pyridine, phosgene, and a fatty acid having from two to eight carbon atoms with an inert diluent in proportions of phosgene to the other ingredients such that the solution will be acid to methyl orange, adding pyridine to make the solution basic to methyl orange, and heating cellulose in the solution in a closed vessel until solution is substantially complete.

20. The method of esterifying cellulose which comprises mixing pyridine and a fatty acid having from two to eight carbon atoms with an inert diluent, passing phosgene into the solution until it becomes acid to methyl orange, adding pyridine to make the solution basic to methyl orange, adding cellulose to the solution and heating in a closed vessel until solution is substantially complete.

21. The method of esterifying cellulose which comprises mixing phosgene, pyridine, a fatty acid having from two to eight carbon atoms, and a different fatty acid having from two to eight carbon atoms in proportions acid to methyl orange, adding pyridine until the solution is basic to methyl orange, and esterifying cellulose with the solution.

22. The method of esterifying cellulose which comprises mixing phosgene, pyridine, an aliphatic monocarboxylic acid having from two to eight carbon atoms, and a different aliphatic monocarboxylic acid having from two to eight carbon atoms, adding pyridine until the solution is basic to methyl orange, and esterifying cellulose with the solution.

23. The method of esterifying carbohydrates which comprises reacting a carbohydrate with the contents of a bath made by mixing an organic carboxylic acid, phosgene, and pyridine.

24. In a process of preparing a bath for the esterification of cellulose the step which comprises reacting phosgene, fatty acids, and pyridine in an inert diluent.

25. In the preparation of aliphatic monocarboxylic esters of carbohydrates the steps which comprise mixing pyridine with acid which is to be reacted with the carbohydrate, adding phosgene, and allowing the phosgene to react with the acid.

26. In the preparation of aliphatic monocarboxylic esters of carbohydrates the steps which comprise mixing pyridine with acid which is to be reacted with the carbohydrate, adding phosgene, and allowing the phosgene to react with the acid, said reaction being carried out in the presence of a diluent.

JOSEPH F. HASKINS.